Figure 1:
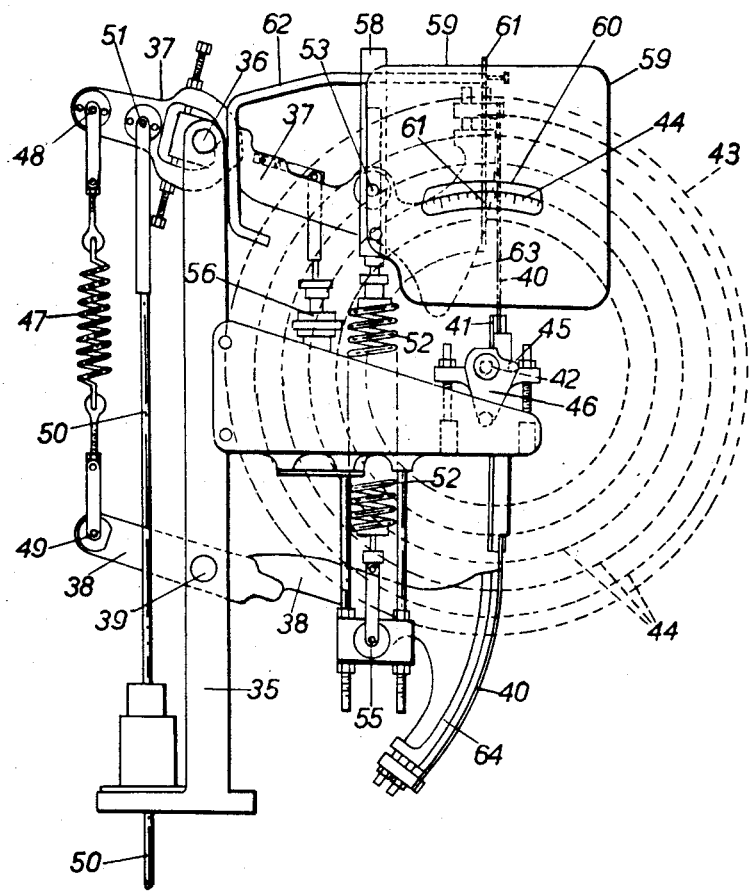

Nov. 1, 1960     D. R. SMITH     2,958,523
WEIGHING MACHINES
Filed July 24, 1957

Inventor
DONALD RYLANDS SMITH
By Linton and Linton
Attorneys

United States Patent Office 2,958,523
Patented Nov. 1, 1960

2,958,523
WEIGHING MACHINES

Donald Rylands Smith, deceased, late of Prenton, Birkenhead, England, by Albert Edward Smith and William Edmund Redfern Short, administrators, Liverpool, England, assignors to I.T.D. Limited, Birmingham, England, a British company Filed July 24, 1957, Ser. No. 673,961

4 Claims. (Cl. 265—27)

This invention relates to weighing machines of the type in which the weight is denoted by a rotatable dial or chart (hereinafter, for convenience of description only, designated "dial"). The limiting factor in this type of weighing machine is usually the number of graduations which can be accommodated in a given dial circle; for example, a scale having two thousand pounds weighing capacity, and which is required to read by two-pound increments, would require a dial at least forty inches in diameter if the graduations were to be not less than one eighth of one inch apart. To avoid necessity for using such a large dial, a combination of a dial indicator and a steelyard and poise (or, a lever and deposited weights) is sometimes used, it being necessary for the reading of the latter to be added to that of the pointer with obvious disadvantages. Another method resorts to the use of a pointer adapted to make more than one revolution, a second scale being provided on which is indicated the amount to be added to the actual pointer reading.

According to the present invention, the load indicating mechanism of a weighing machine comprises a dial adapted to make more than one revolution for the full capacity of the machine and the graduations whereof follow an involute or spiral path, and is characterised in that it comprises a first lever, a second similar lever disposed parallel to said first lever, a flexible steel ribbon connecting the ends of said levers on one side of their pivot points and carrying a rack bar, a spindle carrying the rotary dial and having a pinion in mesh with said rack bar, a tension spring connecting said levers at their ends remote from the flexible steel ribbon, load absorbing means associated with the first lever on one side of its pivot point, means for connecting a load to said lever on the side of its pivot point remote from the load absorbing means, an aperture masking-plate disposed in front of the dial and associated with one of said levers so as to move with same in a weighing operation, the point of association of said masking-plate with the lever being inwardly of the point of connection of said flexible steel ribbon, and a fixed datum pointer extending radially across the dial and which is viewable through the aperture of said masking-plate whereby the magnitude of an applied load is indicated on the visible portion of the invoice or spiral scale.

Thus, for example, a weighing machine having a dial arranged say, to make four revolutions, and with a capacity to weigh loads up to two thousand pounds by two-pound increments, will require a dial having an outside diameter of not more than fifteen inches, with its graduations spaced not less than one eighth of one inch apart. A further advantage resides in the fact that the actual weight of an object being weighed may at once be read off at a fixed point, there being no need for other readings from additional scales, or from a steelyard poise or deposited weights, to be added or subtracted therefrom. The reading, therefore, is not liable to error, and, as there is no manual operation involved, weighing may be effected by unskilled persons without likelihood of damage to the machine. Another advantage resides in the fact that the graduations of the dial require to be uniformly spaced which facilitates considerably accurate calibration of the dial.

We will further describe our invention with the aid of the accompanying explanatory drawing which illustrates a mode of embodiment.

The figure shows a front elevation of the load indicating mechanism.

Referring now to the drawing, 35 denotes a rigidly mounted upright whereto is pivoted at 36 a weighing lever 37 and parallel thereto is a second and similar lever 38 pivoted at 39. Connected to said levers is a flexible steel ribbon 40, said ribbon carrying medially a rack bar 41 in engagement with a pinion 42 of a spindle carrying a rotary dial 43 provided with graduations 44 which follow a spiral path as indicated in the drawing. A guide roller 45 carried by a frame member 46 is provided to prevent rack bar 41 un-meshing from pinion 42 and an adjustable spring 47 connected at 48, 49 to levers 37, 38 maintains ribbon 40 at the requisite tension.

A rod 50 pivotally attached to lever 37 at 51 is for connection to any load supporting medium, and the resistance to a load is absorbed by an extension spring 52 the upper end whereof is pivotally attached to lever 37 at 53, and at the lower end is adjustably connected (to permit zeroing of the indicator) to a fixed frame component 54 as at 55.

A dash pot 56 carried by a frame member 57 prevents undue oscillation of the system in a weighing operation.

Spring 52 is pivotally connected to lever 37 at 53 through the medium of a bracket 58, and attached to said bracket is a masking plate 59 disposed in front of dial 43 and having an elongated aperture 60 to permit viewing of part of the spiral scale 44, the vertical movement of the plate 59 (consequent upon the movement transmitted thereto from lever 37) in a weighing operation being calculated, as also the pitch of the convolutions of the spiral scale 44, to maintain said aperture 60 coincident with the path of the graduations of the scale as the dial 43 rotates. The magnitude of a load applied to rod 50 is indicated on the visible portion of the scale by a fixed datum pointer 61 carried by a bracket 62 mounted on upright 35, and which extends radially across the dial 43 at the rear of masking plate 59.

In order that ribbon 40 shall move in a truly vertical plane, the ends of levers 37, 38 are provided with arcuate segments 63, 64 over which ribbon 40 works in the pivotal movement of said levers.

Ball races or other anti-friction devices are of course fitted wherever necessary.

It will be seen that the combination of said masking plate 59 (which moves arcuately with lever 37) and fixed datum pointer 61 nullifies the fact that plate 59 has a component of horizontal movement in addition to its vertical movement, and permits a true and accurate weight indication to be obtained in a simple manner.

It will, of course, be appreciated that in lieu of a spring or springs as 52, the resistance to a load applied to rod 50 may take the form of an adjustable pendulum or pendulums associated, or integral, with either or both levers 37 or 38.

What we claim as the said invention and desire to secure by Letters Patent is:

1. Load indicating mechanism for a weighing machine, comprising a dial adapted to make more than one revolution for the full weighing capacity of the machine and the graduations of said dial being arranged in a spiral path, an upright, a first lever pivoted to said upright, a second similar lever pivoted parallel to said first mentioned lever, a flexible steel ribbon connecting the ends of said levers on one side of their pivot points, a rack bar carried by said ribbon, a spindle carrying said rotary dial and a pinion carried by said spindle and being in meshed engagement with said rack bar, a tension spring connecting said levers at their ends remote from said flexible steel ribbon, a load absorbing spring connected to said first mentioned lever on one side of its pivot point, means for connecting a load to said first mentioned lever on the side of its pivot point remote from said load absorbing spring, an apertured masking-plate disposed in front of the dial and connected with one of said levers so as to move with same in a weighing operation, the point of association of said masking-plate with said lever being inwardly of the point of connection of said flexible steel ribbon, and a fixed datum pointer extending radially across said dial and which is viewable through the aperture of said masking-plate whereby the magnitude of an applied load is indicated on the visible portion of said spiral scale.

2. Load indicating mechanism as claimed in claim 1, wherein said load absorbing spring is connected to said first mentioned lever through the medium of a bracket whereto is attached said masking-plate.

3. Load indicating mechanism as claimed in claim 1, wherein the ends of said levers carrying said flexible steel ribbon are provided with arcuate segments whereby said ribbon is constrained to move in a truly vertical plane.

4. Load indicating mechanism as claimed in claim 1, including dash pot means positioned between said first mentioned lever and a fixed frame member to prevent undue oscillation of the weighing system.

References Cited in the file of this patent

UNITED STATES PATENTS

| | | |
|---|---|---|
| 1,634,324 | Gase | July 5, 1927 |
| 2,217,244 | Williams | Oct. 8, 1940 |
| 2,617,642 | Singleton | Nov. 11, 1952 |